United States Patent [19]

Shirman et al.

[11] Patent Number: 5,550,960
[45] Date of Patent: Aug. 27, 1996

[54] METHOD AND APPARATUS FOR PERFORMING DYNAMIC TEXTURE MAPPING FOR COMPLEX SURFACES

[75] Inventors: Leon A. Shirman, San Jose; Yakov Kamen, Cupertino, both of Calif.

[73] Assignee: Sun Microsystems, Inc., Mountain View, Calif.

[21] Appl. No.: 101,471

[22] Filed: Aug. 2, 1993

[51] Int. Cl.$^6$ ................................................. G06T 15/00
[52] U.S. Cl. ........................ 395/130; 395/119; 395/125; 395/127
[58] Field of Search ..................... 395/125, 130, 395/126–129, 131, 132, 119

[56] References Cited

U.S. PATENT DOCUMENTS 5,255,352  10/1993  Falk ........................................ 395/125

OTHER PUBLICATIONS

Chakib Bennis, Andre Gagalowicz, "Hierarchical Texture Synthesis on 3–D Surfaces,"*Eurographics 89*, 4 Sep. 1989, pp. 257–268.
S. Vigneaux, T. Kato, A. Ohba, M. Oka, "A Real–Time Video Mapping and Manipulation," *SMPTE Journal*, vol. 100, No. 3, Mar. 1991, pp. 162–166.
D. Ghazanfarpour, B. Peroche, "A High–Quality Filtering Using Forward Texture Mapping,"*Computer and Graphics*, vol. 15, No. 4, 1991, pp. 569–577.
Lance Williams, "Pyramidal Parametrics", Computer Graphics, vol. 17, No. 3, Jul. 1983, pp. 1–11.
James D. Foley, Andries Van Dam, Fundamentals of Interactive Computer Graphics (Addison–Wesley Publishing Company Jul. 1984), pp. 588–590.
Franklin C. Crow, "Summed–Area Tables For Texture Mapping" Computer Graphics, vol. 18, No. 3, Jul. 1984,, pp. 207–211.
David F. Rogers, Rae E. Earnshaw, Computer Graphics Techniques Theory And Practice (Springer Verlag 1990), pp. 159–187.
George Wolberg, Digital Image Warping (IEEE Computer Society Press 1990), pp. 178–184, 189–190.
Yakov Kamen, "Texture Mapping (Part I of V)" Sun Interactive Media, Nov. 1992, pp. 22–29.
Yakov Kamen, "Texture Mapping, Part II: Parametrization" Sun Interactive Media, vol. 2, No. 1, Feb. 1993, pp. 28–34.
Solaris XGL 3.0.1 Programmer's Guide (1993 Sun Microsystems, Inc.), pp. 379–408.
Salim S. Abi–Ezzi, Leon A. Shirman, "The Scaling Behavior Of Viewing Transformations" IEEE Computer Graphics And Applications, May 1993,,pp. 48–54.

*Primary Examiner*—Almis R. Jankus
*Attorney, Agent, or Firm*—Blakely Sokoloff Taylor & Zafman

[57] ABSTRACT

A system and process is provided which enables the dynamic mapping of texture to a variety of primitives, including complex primitives such as non-uniform rational B-spline surfaces (NURBS). The object, located in modeling coordinate (MC) space is parameterized to determine the parameter coordinate (PC) space associated with the object. This step is performed for an object and is readily applied to a variety of textures and views subsequently readied. Once the parameterization process has been performed, a mapping between the PC space and texture coordinate (TC) space is generated. This mapping, referred to herein as the τ mapping correlates the (s,t) coordinates of the PC space to the (u,v) coordinates of the TC space. The object is mapped from the MC space to the display coordinate (DC) and the τ mapping is then used to map the texture map onto the selected points of the object, such as the vertices of the object. Parameter interpolation is then performed to render the pixels of the object in the display space. A color composition process is executed to combine the colors of the texture map with the pixels of the object. Furthermore, in the preferred embodiment, the granularity of the texture applied to the object can be controlled using such techniques as mip-map criteria, texture quality or, in the case of NURBS, NURBS approximation criteria.

20 Claims, 7 Drawing Sheets

METHOD AND APPARATUS FOR PERFORMING DYNAMIC TEXTURE MAPPING FOR COMPLEX SURFACES

BACKGROUND OF THE INVENTION

1. Field of the Invention

The present invention relates to a system and method for rendering textured objects. Particularly, the present invention relates to a system and method for rendering textured NURBS surfaces.

2. Art Background

The ability to provide texturing to a surface enhances rendering capabilities in computer graphics. In one technique, referred to as texture mapping, a map of the texture is generated in a texture coordinate (TC) space. The object to which the texture is to be applied is realized in modeling coordinate (MC) space. A binding processes is then performed to define the correspondence of the texture coordinates to the object coordinates. Typically, the binding process binds the coordinates of the texture map in TC space (e.g., u,v coordinates) to predetermined coordinates of the object in MC space (e.g., x,y,z,w coordinates). A subset of all possible points of the object is typically used, such as the vertices of the object.

Once the binding process is complete, the object is mapped to device coordinate space (DC). In order to determine the texture coordinate associated with each pixel of the object in DC space, an interpolation process, using the subset of all possible points binded, is performed to determine the elements of the texture map to be applied to each coordinate of the object in DC space. A color composition process is subsequently performed to incorporate the colors of the texture map onto the object in the display coordinate space. This object with the colors of the texture is then displayed on the display device. For further information regarding texture and the texturing process see, Kamen, "Texture Mapping", Sun Interactive Media, November 1992, and Kamen, "Texture Mapping, Part II: Parameterization", Sun Interactive Media, February 1993; or Rogers, Earnshaw, Editors, *Computer Graphics Techniques, Theory and Practice*, pp. 159–187 (1990, Springer-Verlag).

However, the binding process is performed for each object and texture combination and the application of different texture maps to the same object requires separate binding processes. Furthermore, for objects defined in parameter coordinate (PC) space, such as non-uniform rational B-spline surfaces (NURBS), the process works only if the PC space is set to equal the TC space or by first tessellating NURBS into triangles and applying known texture mapping processes for each triangle.

SUMMARY OF THE INVENTION

An innovative system and method for texturing objects is provided. In this process, the object located in modeling coordinate (MC) space, or, alternately, world coordinate (WC) space, undergoes a parameterization process to determine parameter coordinate (PC) space associated with the object. This process is performed once for an object regardless of the number of different views or different textures which may be subsequently applied to the object. If the object is a NURBS, further time savings are achieved as the object is already realized in parameter space.

Once the parameterization process has been performed, a mapping between the PC space and texture coordinate (TC) space is generated. This mapping, referred to herein as the $\tau$ mapping, correlates the $(s_1 \ldots s_n)$ coordinates of the PC space to the $(u_1 \ldots u_n)$ coordinates of the TC space. The object is mapped from the MC space to the display coordinate (DC) and the $\tau$ mapping is then used to map the texture map onto the selected points of the object, such as the vertices of the object. In a preferred embodiment, object parameter interpolation is then performed to render the pixels of the object, including the location, colors and intensity of the pixel, in the DC space. A color composition process is executed to interpolate the colors of the mapped texture to render a texture color for each pixel and a composition process is performed to combine the texture colors with the pixels of the object. Other processes and sequences for performing object parameter interpolation, texture mapping, texture interpolation and texture/object composition can also be used. In addition, in the preferred embodiment, the granularity of the texture applied to the object can be controlled using such techniques as mip-map criteria, texture quality or, in the case of NURBS, NURBS approximation criteria.

BRIEF DESCRIPTION OF THE DRAWINGS

The objects, features and advantages of the present invention will be apparent from the following detailed description in which.

DETAILED DESCRIPTION OF THE INVENTION

The method and apparatus of the present invention performs the complex operation of applying texture to objects, including complex objects such as NURBS, in a manner that minimizes computation of mapping functions between textures and objects while enabling the capability to control the quality or granularity of the texture rendered including the capability to provide such graphical aspects as warping.

Figure 1:
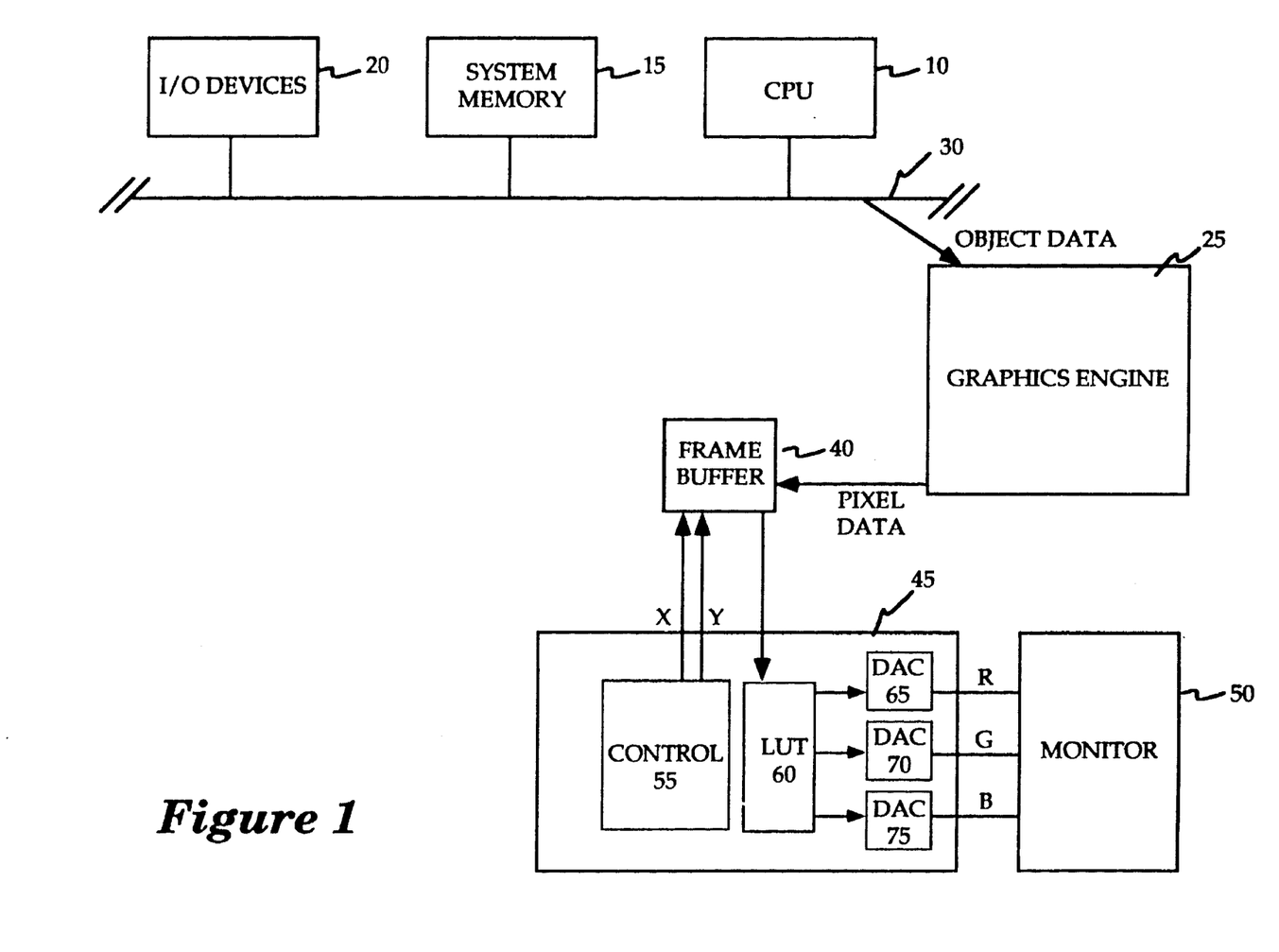
FIG. 1 is a conceptual block diagram illustrating one embodiment of the present invention.

The system of the present invention is conceptually illustrated by the block diagram of FIG. 1. A CPU 10, system memory 15, Input/Output (I/O) devices 20 and a graphics subsystem 25 are coupled via a system bus 30. The CPU 10 functions as the central or host processor and typically executes application programs that generate the objects and apply texture maps to the objects which are displayed in accordance with the present invention. The CPU 10 functions as a powerful general purpose processor and utilizes the available resources such as the system memory 15, I/O devices 20 and other peripherals devices (not shown) to execute complex programs and processes. The CPU 10 may be configured into a system or workstation such as those manufactured by Sun Microsystems, Inc., Mountain View, Calif.

The graphics subsystem is preferably configured to execute graphic specific, often repetitive, processes to offload the processing overhead from the CPU 10. Although the graphics subsystem can be configured a number of ways, in one embodiment the system 25 includes a floating point processor, memory and VLSI, and is configured to execute simple, but costly and highly repetitive computations required as part of the process for rendering objects with texture. For example, at least a portion of the computations can be performed by special, dedicated hardware, such as special VLSI devices for the rendering of triangles representative of the object, in order to further increase the speed of performing the processes. For example, a floating point processor may tessellate the object to triangles and apply the texture to the triangles. The VLSI component then translates the triangles into pixel data for storage in the frame buffer 40. The pixel data is stored in the frame buffer 40 in a sequence readily identified with the x-y coordinate space of the display device 50.

The display controller 45 generates the display of the object defined by the pixel data located in the frame buffer. The display controller 45 through its controller 55 cycles through the frame buffer, one scan line at a time in accordance with the raster scan rate, for example, 60 times a second. Memory addresses are generated by the controller 55 to access the pixel data. The pixel data is read from the frame buffer in sequence and input to the display controller color look-up table (LUT) 60. The LUT 60 contains the digital control signals used to control the intensity and color of the output, for example beams of electrons, on the display device 50. The signals output by the LUT 60 are input to digital to analog converters (DACs) 65, 70 and 75 which generate the analog signals to control the energizing or generation of the location an intensity respectively of the red, green and blue components of the pixel to be displayed. The display device may be a raster scan device such as a cathode ray tube (CRT). For purposes of explanation the display device will be a CRT; however, it is obvious to one skilled in the art that other display devices may be utilized in accordance with the system of the present invention.

If the device is a cathode ray tube, the analog control signals control the number of electrons in the beam. The number of electrons in the beam is determinative of the intensity displayed. By controlling the red, green and blue beams for each pixel in this manner, varying colors and intensities can be produced on the display device. The beam(s) of electrons are directed towards a phosphor coated screen by a high positive voltage applied. The beams are directed toward a particular location (reflective of the x-y coordinate location of the pixel data) by a magnetic field produced by deflection coils. When the electrons of the beam hit the screen, the phosphor emits visible light, the intensity emitted dependent upon the number of electrons which hit the screen.

Figure 2:
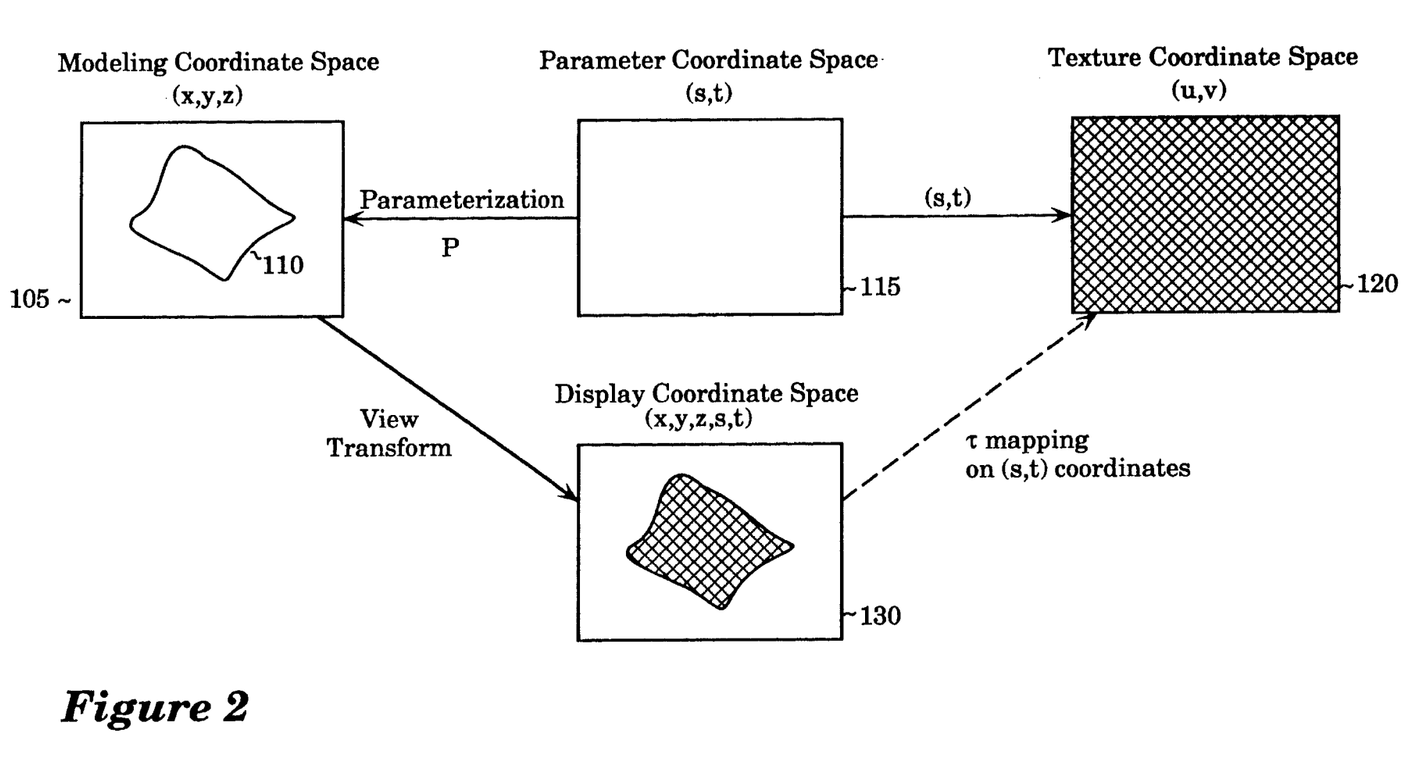
FIG. 2 is a conceptual diagram illustrating the process of the present invention.

The process of the present invention is described generally with reference to FIG. 2. The object is described in MC space 105 or, alternately, world coordinate (WC) space. The texture map is defined in TC space 120. The object is subsequently rendered and displayed in the DC space 130. A parameterization process "P" is used to bind the object 110 to the PC space 115. This process is performed once for an object and is view independent and texture independent. A mapping is then performed between the TC space 120 and PC space 115. This mapping is referred to herein as the τ mapping. The τ mapping is subsequently used to apply the texture map to the object 110 in the display coordinate space 130.

Once the object 110 is transformed via a viewing transformation to DC space 130, the τ mapping is utilized to bring the corresponding texture map values to the DC space where it is applied to predetermined points of the object, such as the vertices of the object. Once the texture values from the texture map are applied to the object in DC space, the texture values are interpolated to apply a texture value to each pixel of the object. A color composition process is then performed to combine the texture values with the colors of the object to generate a pixel image which is stored in the frame buffer and subsequently displayed.

The process of the present invention introduces a new degree of freedom in the modification of texture images as a result of the ability to control the process of texture mapping independently of the primitives' geometry. In addition, this process provides an implementation for a flexible, adaptive strategy for texture mapping wherein all types of primitives are supported. Furthermore, varying levels of quality of the actual textures utilized can be controlled. The process is described in further detail with respect to FIGS. 3a, 3b and 3c.

Figure 3A:
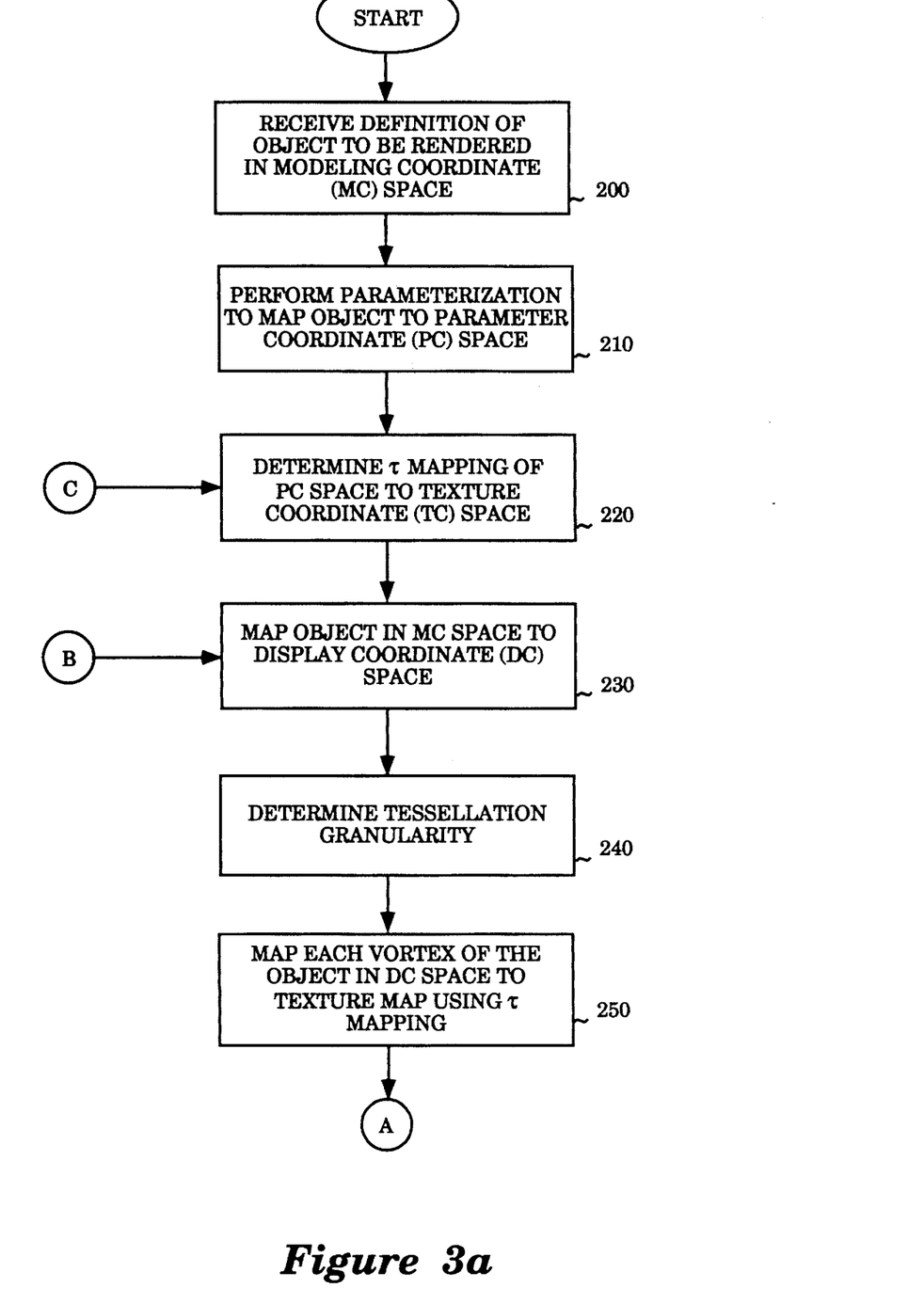
FIGS. 3a, 3b and 3c are flowcharts illustrating the process steps of the present invention.
Figure 3B:
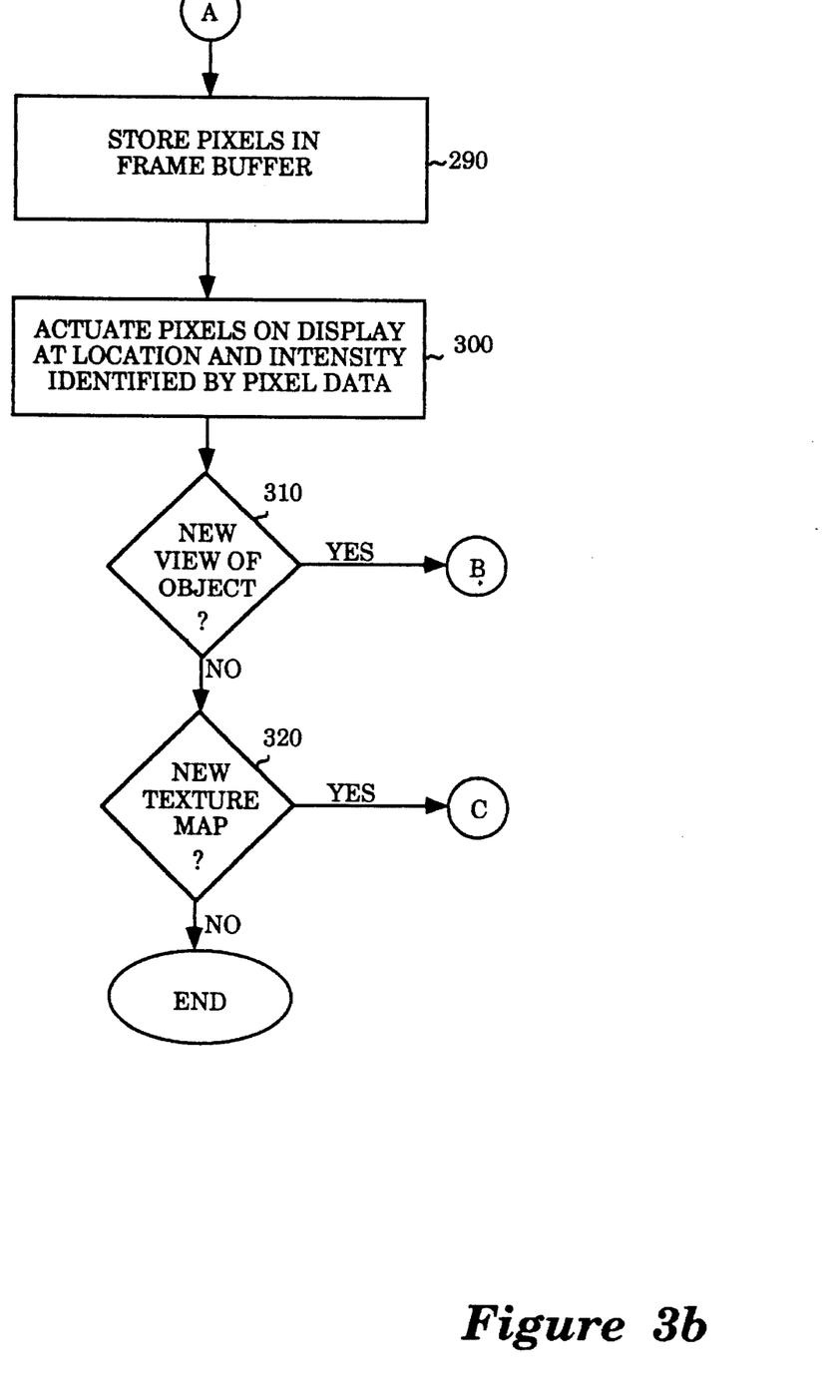

Referring to FIGS. 3a and 3b, the system first receives a definition of the object to be rendered in the modeling coordinates, step 200 (it should be noted that the MC space is also referred to as the object coordinate space). At step 210, a parameterization process is performed to construct a PC space associated with the object. An object, typically a surface, is defined in three dimensional space (e.g., MC space) and therfore coordinates (x,y,z) or alternately, (x,y,z,w) are used. A parameter space is typically a two dimensional space (s,t), defined in such a manner that each point on the object in MC space can be obtained by a mathematical or predefined function of s and t. This function maps the parameter space into MC space. By parameterizing the object, an independent representation of the object is achieved in PC space. The parameterization process can be thought of as binding process where, for example, with respect to polygon primitives, predetermined points (for example, the vertices of the object on the polygon primitive are assigned or binded to values in the PC space. For complex surfaces, such as splines or NURBS, this step is not considered an additional step because the complex surfaces are defined in parameter space. Parameterization is typically a complex process as it involves bending two dimensional parameter values to a three dimensional object. Therefore, an advantage is achieved as the parameterization step is only performed once for any given object.

At step 220, the τ mapping of the PC space to the TC space is generated. This mapping is subsequently used to identify the texture coordinates corresponding to points of the object transformed into the DC space. This mapping also maintains the texture and parameter coordinates as separate parameters. Therefore, the parameter space can be regarded as a property of the primitive and the texture as a separate entity which is subsequently applied to the object. Furthermore, by modifying the τ mapping, the displayed texture image can be easily controlled and modified without modifying the object or the texture map itself. τ mapping is a lot simpler process than parameterization because same-dimensional (e.g., 2 dimensional) spaces are involved, and therefore lends itself to re-execution for different texturing effects. In addition, by separating the parameter coordinate space and the texture coordinate space, very useful quality measures and dynamic texturing for splines can be implemented.

A variety of known methods and functions can be used to generate the τ mapping between the PC space and TC space.

In a simple embodiment, parameter and texture space can be configured to coincide. This embodiment corresponds to traditional texture mapping in which a one-to-one or identity map is established. However, supporting non-identity maps is desirable to enable arbitrary warping effects to be performed on a given texture map to modify the displayed texture. One method for defining the τ mapping is a direct specification in which u=U(s,t), v=V(s,t). This function can be defined to provide a variety of mappings including an identity function. It should be realized that the image of τ mapping does not have to coincide necessarily with the entire texture space. In that instance, portions of the texture map may not be utilized to generate the texture on the object.

Figure 5:
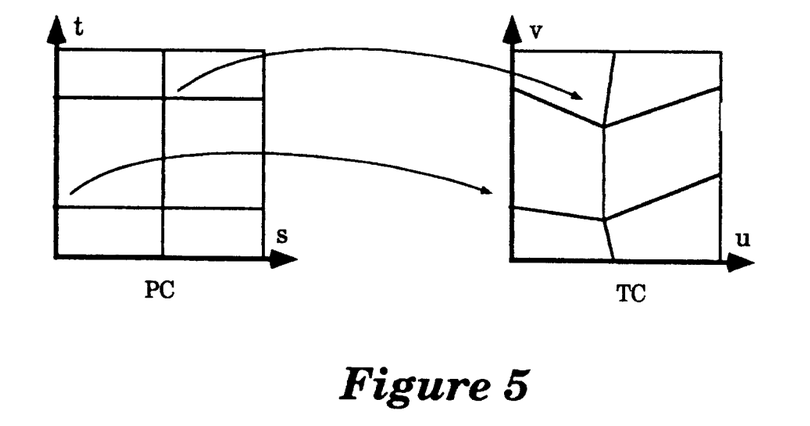
FIG. 5 illustrates visually the $\tau$ mapping between the parameter coordinate (PC) space and the texture coordinate (TC) space.

Alternately, the τ mapping is generated by selecting a set of points in PC space, P=[$(s_i,t_j)$] in PC space, and a corresponding set of interpolation values, T=[$(U(s_i,t_j),V(s_i,t_j))$], in TC space. For example, the set P can form a grid in PC space (i.e., P is a set of nm values [$(s_i,t_j)$], where $1<=i<=n$ and $1<=j<=m$) or a set of arbitrary values. Preferably, the only restriction on P is that it should contain all four corners, (smin, tmin), (smin, tmax), (smax, tmin), (smax, tmax), of the PC space. The interpolation process utilized can be a piece-wise linear interpolation or a spline of a higher order. For example, FIG. 5 shows a rectangular grid in PC space and corresponding interpolation values in TC space.

Although the τ mapping can be performed to map a texture coordinate of the texture map on each pixel of the object in the display space, this is a computationally intensive operation, especially if the mapping is spline-based. Preferably, the τ mapping, e.g., the corresponding texture coordinates, is determined for a subset of all pixels of the object image. For example, the subset of points can be a set of predetermined points, such as the vertices of the object. Although the mapping identifies only the corresponding texture coordinates for the subset of points, the texture coordinates for pixels between vertices are then determined by interpolating between the subset of points. That is, instead of applying the τ mapping at every pixel in order to determine the texture coordinates, texture coordinates for a subset of pixels can be determined and the texture values for the remaining pixels are generated by interpolation.

One interpolation method that can be utilized is linear interpolation. In this approach, a triangulation of the set P is performed using available techniques such as the Voronoi diagrams. See (Franco Preparata and Michael Shamos, "Computational Geometry: An Introduction", Springer-Verlag 1988, pp. 198–216). Each point of the object in PC space, that is not within the set of P, lies exactly within one triangle. Therefore, the barycentric coordinates of each point can be computed. The texture coordinates of the image of this point is calculated using the barycentric coordinates in the TC space. This method is very general and works for arbitrary sets of P. Furthermore, spline interpolation on triangles can be used instead of linear interpolation. Regarding triangular spline interpolation, see, for example, G Farin, *Curves and Surfaces for Geometric Design*, (Academic Press 1991), pp. 235–254.

Figure 6A:
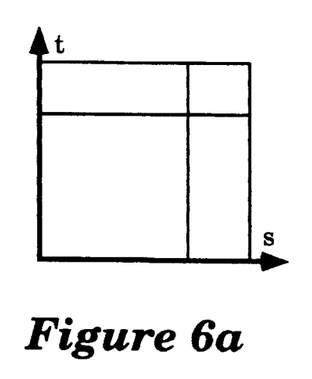
FIGS. 6a–6e illustrate exemplary interpolation techniques to generate texture on the object.
Figure 6B:
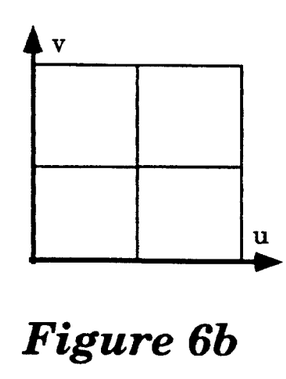
Figure 6C:
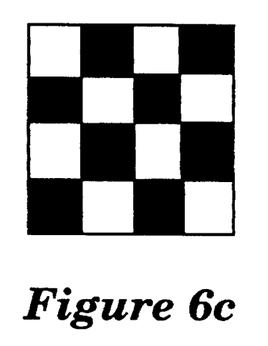
Figure 6D:
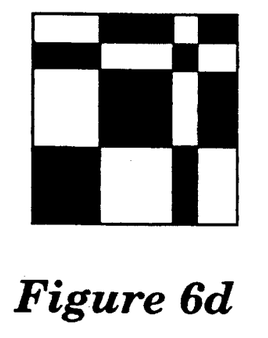
Figure 6E:
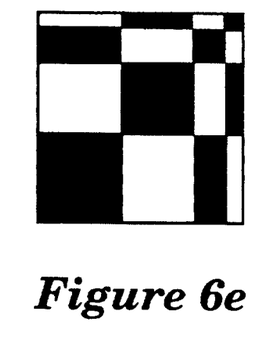

Alternately, bilinear interpolation on rectangles can be used. This approach assumes that the set P forms a regular grid. A bilinear interpolation is then used to determine the τ mapping for the intermediate points. Generally, the process of finding a rectangle in PC space containing the given point is simpler than finding the corresponding triangle. For example, P may be defined to form a regular grid. If P does not form a regular grid, the smallest grid containing P is constructed. This can be accomplished by drawing vertical and horizontal lines through each point in the set P. The intersecting points of these lines then form a regular grid P' containing P. The interpolation values for the points in P'-P can again be estimated using linear interpolation. Furthermore, smooth spline interpolation using tensor-product interpolants on a regular grid can be performed using known techniques (see Farin, *Curves and Surfaces for Geometric Design* at pp. 221–233). Exemplary results of bilinear and smooth interpolation on rectangles are shown on FIGS. 6a through 6e. FIGS. 6a and 6b show interpolation grids in PC space and TC space respectively. FIG. 6c shows a checkered board texture map. FIG. 6d shows a resulting image after applying bilinear interpolation mapping between PC and TC. FIG. 6e shows the same image after applying smooth interpolation mapping.

Referring back to FIGS. 3a and 3b, at step 230, the tessellation granularity is determined. This is an optional step which is particularly useful for the dynamic tessellation of textured NURBS surfaces. It is preferred that at this point in the process the NURBS object is tessellated into facets. Although, the discussion below is in the context of NURBS, it is apparent to one skilled in the art that the techniques are readily applicable to other types of surfaces as well as other types of primitive objects. The concept of dynamic tessellation of NURBS curves and surfaces can therefore be expanded to include textured NURBS surfaces. In this method, the tessellation threshold criteria can be specified in DC space, MC space, PC space or TC space in order to achieve the tessellation granularity desired. Abi-Ezzi, et at, (see, for example, Abi-Ezzi, Shirman, "The Tessellation of Curved Surfaces Under Highly Varying Transformations", Proceedings Eurographics '91, 1991, pp. 385–397) describes the concept of dynamic tessellation of NURBS curves and surfaces. A NURBS surface described by control points is displayed by breaking or tessellating the surface into planar facets (such as triangles) defined by vertices and rendering the planar facets. The granularity of the tessellation is controlled by the application specified approximation criteria. For example, the application may require that the maximum size of a facet in DC or WC can not exceed a specified tolerance. Therefore, when a viewing or modeling transformation changes, the tessellation is dynamically adjusted to honor the approximation criteria.

Typically, NURBS are tessellated in WC or LC space Abi-Ezzi, et al (see, for example, Abi-Ezzi, Shirman, "The Tessellation of Curved Surfaces Under Highly Varying Transformations", Proceedings Eurographics '91, 1991, pp. 385–397). However, for purposes of explaining the tessellation process of texture NURBS, tessellation is assumed to occur in MC or WC space. Thus, an estimate of how a tolerance specified in DC is mapped to MC is determined. Preferably, this is determined by generation of a closed form expression for the minimum and maximum scale factors of a perspective transformation in a bounded region. (See, Abi-Ezzi, Shirman, "Scaling Behavior of Viewing Transformations", Computer Graphics and Applications, May 1993, pp. 48–54.) For textures, it is preferable to specify tolerance in texture coordinates so that the triangle size of the facets does not exceed a given tolerance in TC space.

Figure 4:
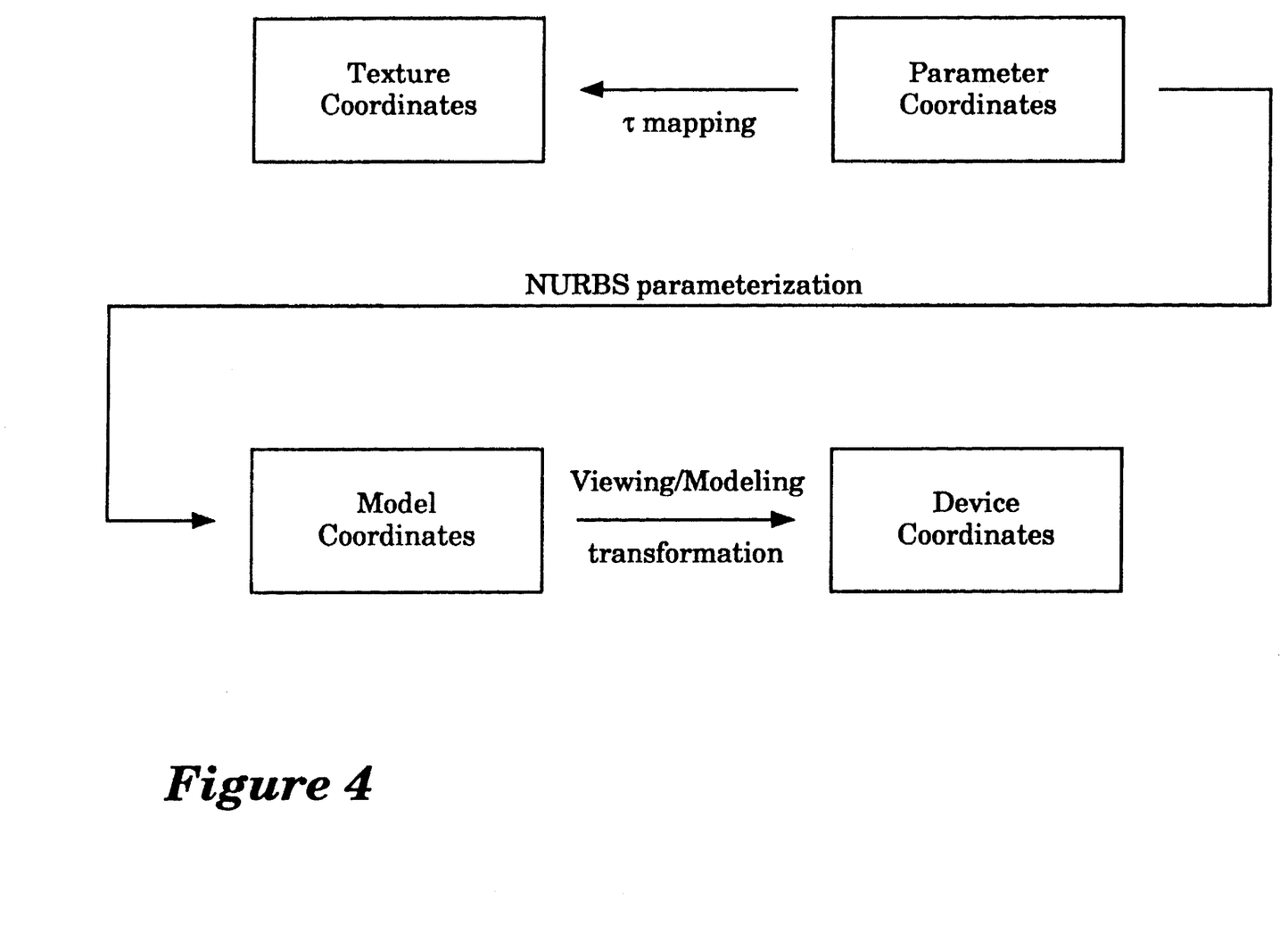
FIG. 4 illustrates mappings between different coordinate spaces.

FIG. 4 visually illustrates various coordinate spaces and mappings between them. To estimate the scaling of a threshold from TC to PC, the bounds on the PC to TC (i.e., the τ mpping) are used. Since the τ mapping is typically piecewise linear, the bounds are easily estimated. Once the bounds are estimated in PC space, the NURBS is tessellated at specified regular intervals in PC space (i.e., constant parametric approximation criterion). Thus, thresholds can be specified in TC, PC, MC, or DC space and the surface can be dynamically tessellated to meet the thresholds.

For example, given a maximum triangle sized in MC space, the number of segments needed to evaluate a surface patch is:

$$n_s = \frac{\|S's\|}{d_{s,mc}} \quad n_t = \frac{\|S't\|}{d_{t,mc}}$$

where $n_s$ and $n_t$ are the required number of steps or segments in the s and t direction, respectively, $d_{s,mc}$ and $d_{t,mc}$ represent the thresholds of the NURBS in MC space, and $\|S's\|$ and $\|S't\|$ are the maximum derivative bounds of the surface patch in corresponding directions (it is assumed here that the patch is parameterized from 0 to 1) in MC space. For further information see, Abi-Ezzi, Shirman, "The Tessellation of Curved Surfaces Under Highly Varying Transformations", Proceedings, Eurographics '91, pp. 385–397.

If the maximum triangle size d is specified in DC space (i.e., pixels), the sizes $d_{s,dc}$, $d_{t,dc}$ are mapped to MC space using the scaling behavior of a viewing transformation and the norm of the modeling transformation. For further information regarding the determination of threshold in MC space, see for example, Abi-Ezzi, Shinnan, "Scaling Behavior of Viewing Transformations", Computer Graphics and Applications, May 1993. Once the mapping is performed, the number of segments $n_s$, $n_t$ are determined as above:

$$n_s = \frac{\|S's\|}{d_{s,mc}} \quad n_t = \frac{\|S't\|}{d_{t,mc}}$$

If the thresholds are specified in PC space, the number of segments per patch is $n_s=1/d_{s,pc}$ and $n_t=1/d_{t,pc}$. However, if the maximum size d is specified in TC space (i.e., texels), the minimum size in PC is estimated using the $\tau$ mapping:

$$d_{s,pc} = \frac{d_{s,tc}}{\|\tau's\|} \quad d_{t,pc} = \frac{d_{t,tc}}{\|\tau't\|}$$

where $\|\tau_s\|$ and $\|\tau_t\|$ are the maximum derivative bounds of the $\tau$ mapping in s,t. The number of segments is then determined to be the inverses of $d_{s,pc}$ and $d_{t,pc}$:

$$n_s = \frac{\|\tau's\|}{d_{s,tc}} \quad n_t = \frac{\|\tau't\|}{d_{t,tc}}$$

It should be noted that the threshold specified in DC space is view dependent while the threshold specified in TC space is not. In some instances, it is desirable to combine thresholds specified in TC space and thresholds specified in DC space or MC space. For example, it may be desirable to maintain a certain quality of texture for different views. Therefore, a single step size should be selected to satisfy both thresholds:

$$n_s = g(n_s^N, n_s^T, \text{thresh})$$

$$n_t = g(n_t^N, n_t^T, \text{thresh})$$

where $n_s^N$ and $n_t^N$ are the number of steps computed from thresholds in DC or MC space, $n_s^T$ and $n_t^T$ are the number of steps computed in TC space, and thresh represents a predefined maximum value. For example, thresh could correspond to the number of steps obtained by specifying the threshold $d_{s,dc}$ $d_{t,dc}$ to be equal to one pixel in DC space. The function g is typically an averaging function. For example, could be defined as:

$$\min(\max(n^N n^T), \text{thresh})$$

Other combining techniques can also be used. For example, the step size determined according thresholds specified in TC and MC or DC can be averaged to generate a uniform step size for tessellation.

The thresholds can also be used to determine the appropriate mip-map level. Once the number of steps $n_s$, $n_t$ have been determined according to one of the above formulas, the thresholds in TC space can be determined as follows:

$$d_{s,tc} = \frac{\|\tau's\|}{n_s}, \quad d_{t,tc} = \frac{\|\tau't\|}{n_t}$$

The mip-map level can then be determined by, for example:

$$l = \left\lfloor \log_4 \frac{1}{f(d_{s,tc}, d_{t,tc})} \right\rfloor$$

where l represents the mip-map level, $f(d_{s,tc}, d_{t,tc})$ represents some function of the thresholds, such as the product of the thresholds or the maximum of the product squared, and it is assumed that the TC space ranges from 0 to 1 in both u and v.

Referring back to FIGS. 3a and 3b at step 240, the object located in MC space is mapped to the display coordinate (DC) space. This step is accomplished using a variety of known techniques. For example, the object in MC space is transformed to the world coordinate (WC) system by a modeling transformation. The World Coordinate system is the coordinate system in which the different portions of a graphic object to be rendered are assembled. Through a viewing transformation, the graphic object in the WC system is transformed to the DC system which corresponds to the screen space of the display. (For further information, see Foley, Van Dam, Feiner, Hughes, *Computer Graphics Principles and Practice* (Addison-Wesley Publishing Company, 1990), for example, pp. 279–281). Alternately, the object can be transformed to lighting coordinate (LC) space through a rigid transformation and subsequently to the DC space through a sparse transformation (see, Abi-Ezzi, Wozny, "Factoring a Homogenous Transformation for a More Efficient Graphics Pipeline", Computer Graphics, Vol. 15, No. 2, pp. 249–258, 1991).

Once the object is mapped to DC space the texture is applied to the object. This process referred to generally herein as interpolation and color composition process, step 250 can be achieved a variety of ways. The process is explained with reference to FIG. 3c.

Figure 3C:
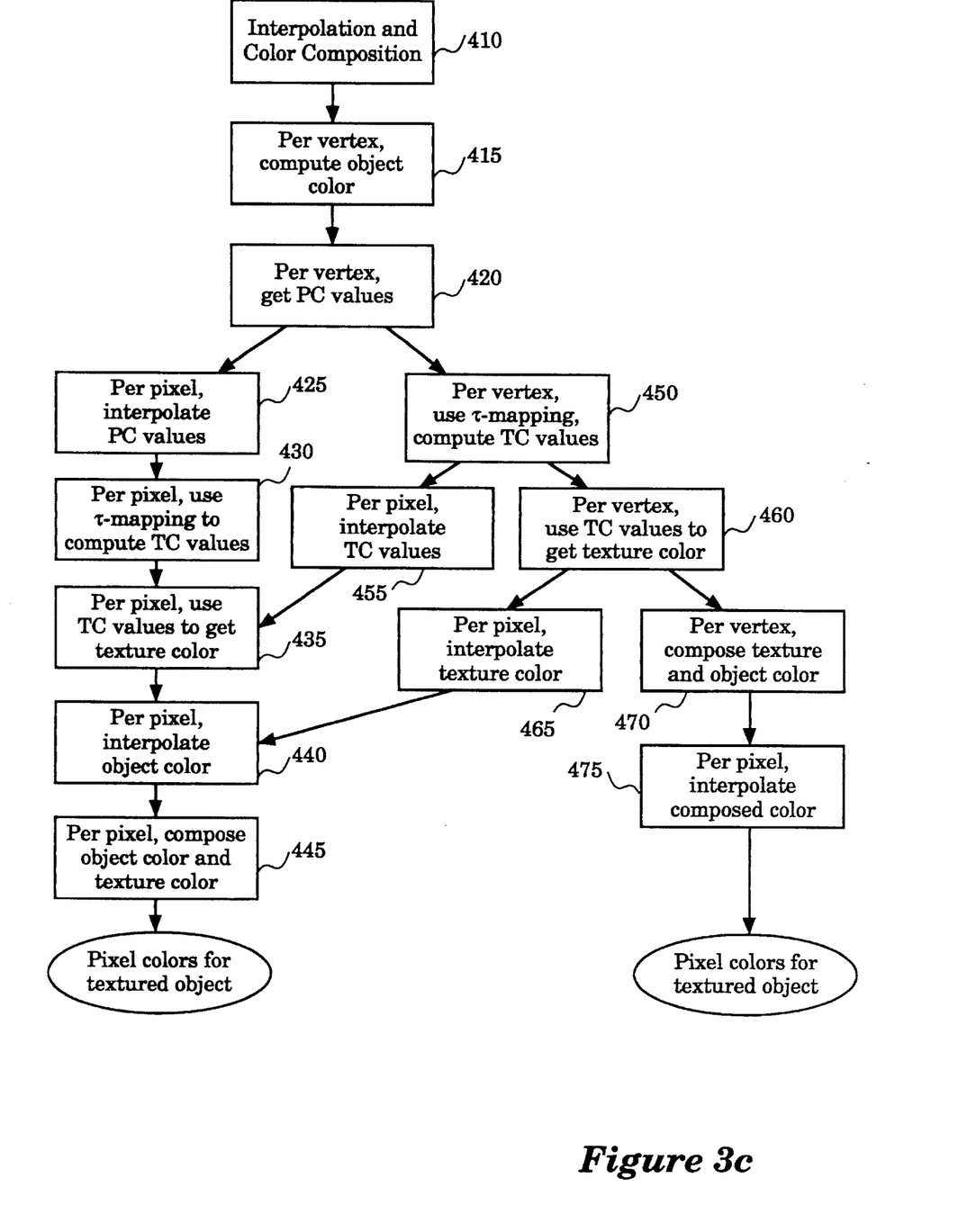

Referring to FIG. 3c, at step 415, the colors at the vertices are determined. The corresponding PC coordinate values at the vertices are retrieved, step 420. In one process, represented by steps 425, 430, 435, 440 and 445, interpolation is performed on the vertices of the object to generate the individual pixels representative of the object (step 425). Well known techniques are used to generate the pixel image from predetermined parameters of the object (such as the vertices of the object) such as line scan algorithms and the like. Alternately, for complex objects like NURBS, other known techniques are utilized, such as triangulation of the object surfaces and subsequently rendering the triangles generated using known scan line algorithms. The $\tau$ mapping is used to determine the corresponding TC coordinates for each pixel (step 430). The texture colors are then determined a variety of known techniques can be used, such as a direct lookup of texture values. Furthermore, techniques such as mip-mapping and summed area tables can be used to perform the interpolation. See, for example, Williams, "Pyramidal Parametrics", Computer Graphics, Vol. 17, No. 3, July 1983 and "Crow, Summed Area Tables for Texture Mapping", Computer Graphics, Vol. 18, No. 3, pp. 207–211, July 1984. At step 440, interpolation of the object colors at the vertices is performed to determine the object colors at each pixel. A composition process is then performed, step 445 to compose or combine the object color and texture color to determine the final pixel color for the textured object. A variety of known color composition processes to combine two colors can be used. For example, the texture color can simply replace the object color and therefore the pixel color will be the texture color. Alternately, the pixel color can be the a combination of both the object color and texture color, such as simple averaging, weighted sum or averaging or the like. For further information, for example, see, Solaris$^{(R)}$ XGL™ 3.0.1 Programmer's Guide, SunSoft (1993, Sun Microsystems, Inc.), pp. 387–389.

Alternately, the following process may be used. This process is preferred when the granularity of tessellation is determined using thresholds specified in TC space. The TC coordinate values corresponding to the vertices of the object are first determined using the τ mapping, step 450. Once the TC coordinate values are determined, interpolation processes can be performed at different levels of information in order to determine the pixel colors of the textured object. In this process, represented by steps 455, 435, 440, 445, the TC coordinate values are interpolated to determine the corresponding TC values at the vertices of the object. The texture colors are then extracted (step 435), the object colors interpolated (step 440) and the object color and texture color at each pixel are composed to generate the pixel color for the textured object (step 445).

In another process, once the τ mapping is used to compute the TC coordinate values at the vertices of the object (step 450), the texture color at each vertex is determined, step 460. At this point in the process, interpolation can be performed on the texture color values to generate texture color values for each pixel of the object (step 465) or a composition process can be performed at the vertices to combine the object color at each vertex with the corresponding texture color (step 470). If the texture color interpolation process is performed (step 465), the object colors at the object vertices are then interpolated to generate a color value at each pixel of the object (step 440) and at each pixel, a composition process is performed to generate the colors of texture object (step 445). If the composition process is first performed (step 470), an interpolation of the composed colors at the vertices are interpolated, step 475, to generate the colors of the textured object.

From the above discussion the process variations are distinguished by the points in the processing at which interpolation of the vertex information is performed to generate per-pixel information. The choice of which variation to utilize will depend upon quality and performance considerations. In particular, the higher the quality, the poorer the performance. Therefore, interpolation of the PC values (e.g., steps 415, 420, 425, 430, 435, 440, 445) produce the highest quality image, but require the greatest amount of memory and processing overhead due to the number of per-pixel operations that are performed. Interpolating the TC values (e.g., steps 415, 420, 450, 455, 435, 440, 445) produces the next best quality image with slightly higher performance. It follows that interpolating the texture color (e.g., steps 415, 420, 450, 460, 465, 440, 445) is higher in performance and poorer in quality, followed by interpolation of the composed vertex colors (e.g., steps 415, 420, 450, 460, 470, 475) which is the fastest process as the number of per-pixel operations is limited to the last step (step 475) in which the composed colors are interpolated.

Referring back to FIG. 3b, the resultant pixels generated with corresponding color and intensity values are stored in the frame buffer, step 290. At step 300, the pixels are actuated on the display at the location and intensity identified by the pixel data stored in frame buffer to generate on the display the textured object.

One readily apparent advantage to the process is that the entire process does not need to be re-executed if, for example, a new view of the object is to be rendered, step 310. If a new view is to be rendered, the process branches to step 230 thereby eliminating the need to reperform the parameterization process (step 210) and the determination of the τ mapping (step 220). Similarly, at step 320, a new texture map can be generated with respect to the same object. In this case, the τ mapping at step 220 would be regenerated to accommodate a new texture map and the process of parameterization of the object, step 210, does need not be re-executed. This allows the generation of special visual effects, such as warping and the like, without affecting any texture and parameterizations performed.

The invention has been described in conjunction with the preferred embodiment. However, it is evident that numerous alternative modifications at variations of the uses will be apparent to those skilled in the art in light of the foregoing description.

What is claimed is:

1. In a computer system comprising a central processing unit (CPU), memory and input/output devices including a graphic display controller coupled to a graphic display device, a method for the rendering of textured objects on the graphic display device, each of said textured objects comprising an object and a texture applied to the object, said objects defined by a plurality of vertices in Modeling Coordinate (MC) space, transformed to World Coordinate (WC) space and rendered as images in Device Coordinate (DC) space, each vertex having an associated color value, said graphic display device defined according to DC space, said texture defined by a texture map in Texture Coordinate (TC) space, said texture map identifying colors of the texture, said method comprising the steps of:

constructing a Parameter Coordinate (PC) space associated with the object;

generating a τ mapping of the PC space to the TC space;

transforming the vertices of the object in MC space to the DC space;

mapping the texture map to the object in DC space using the τ mapping;

composing the color values of the object with the mapped texture values to generate textured object pixel data;

storing each pixel data in a frame buffer, each pixel data being stored at a location in the frame buffer corresponding to the location of the pixel in the DC space; and said graphic display controller reading the pixel data stored in the frame buffer and generating control signals to actuate the pixels at the location and color indicated by the pixel data;

wherein textured objects are generated for display.

2. The method as set forth in claim 1, wherein the step of constructing a Parameter Coordinate (PC) space associated with the object comprises the step of assigning the vertices of the object in MC space to values in PC space.

3. The method as set forth in claim 1, wherein the step of generating a τ mapping comprises the step of defining by direct specification wherein the (u,v) coordinates of the TC space are specified with a corresponding (s,t) coordinate of the PC space, such that u=U(s,t) and v=V(s,t), where U(s,t) and V(s,t) represent functions of the (s,t) coordinates.

4. The method as set forth in claim 1, wherein the step of generating a τ mapping comprises the steps of:

selecting a set of points in PC space, P=[$(s_i,t_j)$], where $(s_i,t_j)$ represent the (s,t) coordinates in PC space for a set of points;

determining a set of interpolation values TC space, T=[$(U(s_i,t_j), V(s_i,t_j))$], where $(U(s_i,t_j), V(s_i,t_j))$ represents the (u,v) coordinates of the TC space to be interpolated;

interpolating the (u,v) coordinates to be interpolated to generate the τ mapping.

5. The method as set forth in claim 4, wherein the step of interpolating comprises linear interpolation.

6. The method as set forth in claim 4, wherein the step of interpolating comprises spline interpolation.

7. The method as set forth in claim 1, further comprising the step of determining the tessellation granularity of the texture applied to the object.

8. The method as set forth in claim 7, wherein the object comprises a NURBS, the tessellation criteria for the texture and the NURBS specified in MC space and the number of steps in PC space to tessellate the texture and the object to obtain the vertices associated with the tessellated object is determined according to the following:

$$n_s = \frac{\|S's\|}{d_{s,mc}} \quad n_t = \frac{\|S't\|}{d_{t,mc}}$$

where $n_s$ and $n_t$ represent the required number of steps or segments in s and t directions, respectively, $d_{s,mc}$ and $d_{t,mc}$, represent thresholds of the NURBS in MC space, and $\|S's\|$ and $\|S't\|$ are the maximum derivative bounds of the surface patch in the s and t directions in MC space.

9. The method as set forth in claim 7, wherein the object comprises a NURBS, the tessellation threshold criteria is specified in TC space and the number of steps in PC space to tessellate the texture and the object to obtain the vertices associated with the tessellated object is determined according to the following:

$$n_s = \frac{\|\tau's\|}{d_{s,tc}} \quad n_t = \frac{\|\tau's\|}{d_{t,tc}}$$

where $d_{s,tc}$ and $d_{t,tc}$ represent thresholds in TC space and $\|\tau_s'\|$ and $\|\tau_t'\|$ are the maximum derivative bounds of the τ mapping in s,t.

10. The method as set forth in claim 7, wherein the object comprises a NURBS, the tessellation threshold criteria is specified in DC space and the number of steps in PC space to tessellate the object and the step of determining the tessellation granularity comprises the steps of:

mapping the threshold criteria $d_{s,dc}$ and $d_{t,dc}$ to the MC space to provide $d_{s,mc}$ and $d_{t,mc}$ using the scaling behavior of a viewing transform for the object and the norm of a modeling transformation; and determining the number of steps $n_s,n_t$ according to the following;

$$n_s = \frac{\|S's\|}{d_{s,mc}} \quad n_t = \frac{\|S't\|}{d_{t,mc}}$$

where $\|S's\|$ and $\|S't\|$ the maximum derivative bounds of the surface patch in the s and t directions in MC space.

11. The method as set forth in claim 7, wherein the object comprises a NURBS, the tessellation threshold criteria is specified in MC or DC space and TC space and the number of steps in PC space to tessellate the object and the step of determining the tessellation granularity comprises the steps of:

determining the number of steps from the threshold criteria specified in MC/DC space;

determining the number of steps from the threshold criteria specified in TC space;

generating a single size from both threshold criteria according to the following:

$$n_s = g(n_s^N, n_s^T, \text{thresh})$$

$$n_t = g(n_t^N, n_t^T, \text{thresh})$$

where thresh represents a predefined maximum value, g represents an averaging function, and where $n_s^N$ and $n_t^N$ are the number of steps computed from thresholds in DC or MC space, $n_s^T$ and $n_t^T$ are the number of steps computed in TC space.

12. The method as set forth in claim 7, said method further comprising the step of, once the tessellation granularity $n_s$, $n_t$ is determined, determining a mip-map level of texture from the corresponding threshold criteria in TC space, according to the following:

$$d_{s,tc} = \frac{\|\tau's\|}{n_s}, \quad d_{t,tc} = \frac{\|\tau't\|}{n_t}$$

where $\|\tau_s'\|$ and $\|\tau_t'\|$ are the maximum derivative bounds of the τ mapping in s,t.

13. The method as set forth in claim 12, wherein the step of determining the mip-map level is performed according to:

$$l = \left\lfloor \log_4 \frac{1}{f(d_{s,tc},d_{t,tc})} \right\rfloor$$

where l represents the mip-map level, $f(d_{s,tc}, d_{t,tc})$ represents a function of the threshold values.

14. The method as set forth in claim 1, wherein the step of transforming the vertices of the object in MC space to the DC space comprises the step of transforming the object via a modeling transformation.

15. The method as set forth in claim 1, wherein the steps of mapping the texture map to the object in DC space using the τ mapping and composing the color values of the object with the mapped texture values to generate textured object pixel data comprises the steps of:

determining the PC values of the vertices;

interpolating PC values of the vertices to generate PC values of the pixels comprising the object;

for each pixel, computing the corresponding TC values of the texture map using the τ mapping;

for each pixel, determining the texture color for the corresponding TC values;

interpolating the object colors at the vertices to determine the object colors at each pixel; and composing the object color and texture color at each pixel to generate the object pixel data.

16. The method as set forth in claim 1, wherein the steps of mapping the texture map to the object in DC space using the τ mapping and composing the color values of the object with the mapped texture values to generate textured object pixel data comprises the steps of:

determining the PC values of the vertices;

using the τ mapping, computing TC values at the vertices;

interpolating the TC values at the vertices to determine a TC value for each pixel of the object;

for each pixel, determining the texture color for the corresponding TC values;

interpolating the object colors at the vertices to determine the object colors at each pixel; and composing the object color and texture color at each pixel to generate the object pixel data.

17. The method as set forth in claim 1, wherein the steps of mapping the texture map to the object in DC space using the τ mapping and composing the color values of the object with the mapped texture values to generate textured object pixel data comprises the steps of:

determining the PC values of the vertices;

using the τ mapping, computing TC values at the vertices;

determining the texture color from the TC values at the vertices;

interpolating the texture colors at the vertices to determine a texture color for each pixel of the object;

interpolating the object colors at the vertices to determine the object colors at each pixel; and composing the object color and texture color at each pixel to generate the object pixel data.

18. The method as set forth in claim 1, wherein the steps of mapping the texture map to the object in DC space using the τ mapping and composing the color values of the object with the mapped texture values to generate textured object pixel data comprises the steps of:

determining the PC values of the vertices;

using the τ mapping, computing TC values at the vertices;

determining the texture color from the TC values at the vertices;

composing the object color and texture color at each vertex;

interpolating the composed colors at the vertices to determine a color for each pixel of the object to generate the object pixel data.

19. In a computer system comprising a central processing unit (CPU), memory and input/output devices including a graphic display device, an apparatus for the rendering of textured objects on the graphic display device, each of said textured objects comprising an object and a texture applied to the object, said objects defined by a plurality of vertices in Modeling Coordinate (MC) space, transformed to World Coordinate (WC) space and rendered as images in Device Coordinate (DC) space, each vertex having an associated color value, said graphic display device defined according to DC space, said texture defined by a texture map in Texture Coordinate (TC) space, said texture map identifying colors of the texture, said apparatus comprising:

a Parameter Coordinate (PC) space associated with the object;

a τ mapping of the PC space to the TC space;

a first transformation means for transforming the vertices of the object in MC space to the DC space;

a mapping means for mapping the texture map to the object in DC space using the τ mapping;

a color composition means for composing the color values of the object with the mapped texture values to generate textured object pixel data;

a frame buffer for the storage of each pixel data wherein memory locations of the frame buffer correspond to locations in DC space;

a graphic display controller coupled to the graphic display device and the frame buffer for reading the pixel data stored in the frame buffer and generating control signals to actuate the pixels at the location and color indicated by the pixel data;

wherein textured objects are generated for display.

20. A computer system for the rendering of textured objects on the graphic display device, each of said textured objects comprising an object and a texture applied to the object, said objects defined by a plurality of vertices in Modeling Coordinate (MC) space, transformed to World Coordinate (WC) space and rendered as images in Device Coordinate (DC) space, each vertex having an associated color value, said graphic display device defined according to DC space, said texture defined by a texture map in Texture Coordinate (TC) space, said texture map identifying colors of the texture, said system comprising:

a host processor, said host processor comprising;
    means for determining a Parameter Coordinate (PC) space associated with the object;
    means for determining a τ mapping of the PC space to the TC space;
    a first transformation means for transforming the vertices of the object in MC space to the DC space;
    a mapping means for mapping the texture map to the object in DC space using the τ mapping;

a graphics processing sub-system coupled to the host processor, said subsystem comprising a color composition means for generating and composing the color values of the object with the mapped texture values to generate textured object pixel data;

a frame buffer for the storage of each pixel data wherein memory locations of the frame buffer correspond to locations in DC space;

a graphic display controller coupled to the graphic display device and the frame buffer for reading the pixel data stored in the frame buffer and generating control signals to actuate the pixels at the location and color indicated by the pixel data;

wherein textured objects are generated for display.

* * * * *